Sept. 13, 1938.  C. MORTENSEN  2,130,098
LIQUID TREATING AND HANDLING APPARATUS
Filed March 19, 1937  2 Sheets-Sheet 1

Inventor.
Cornelius Mortensen,
BY D. P. Wolhaupter
Attorney

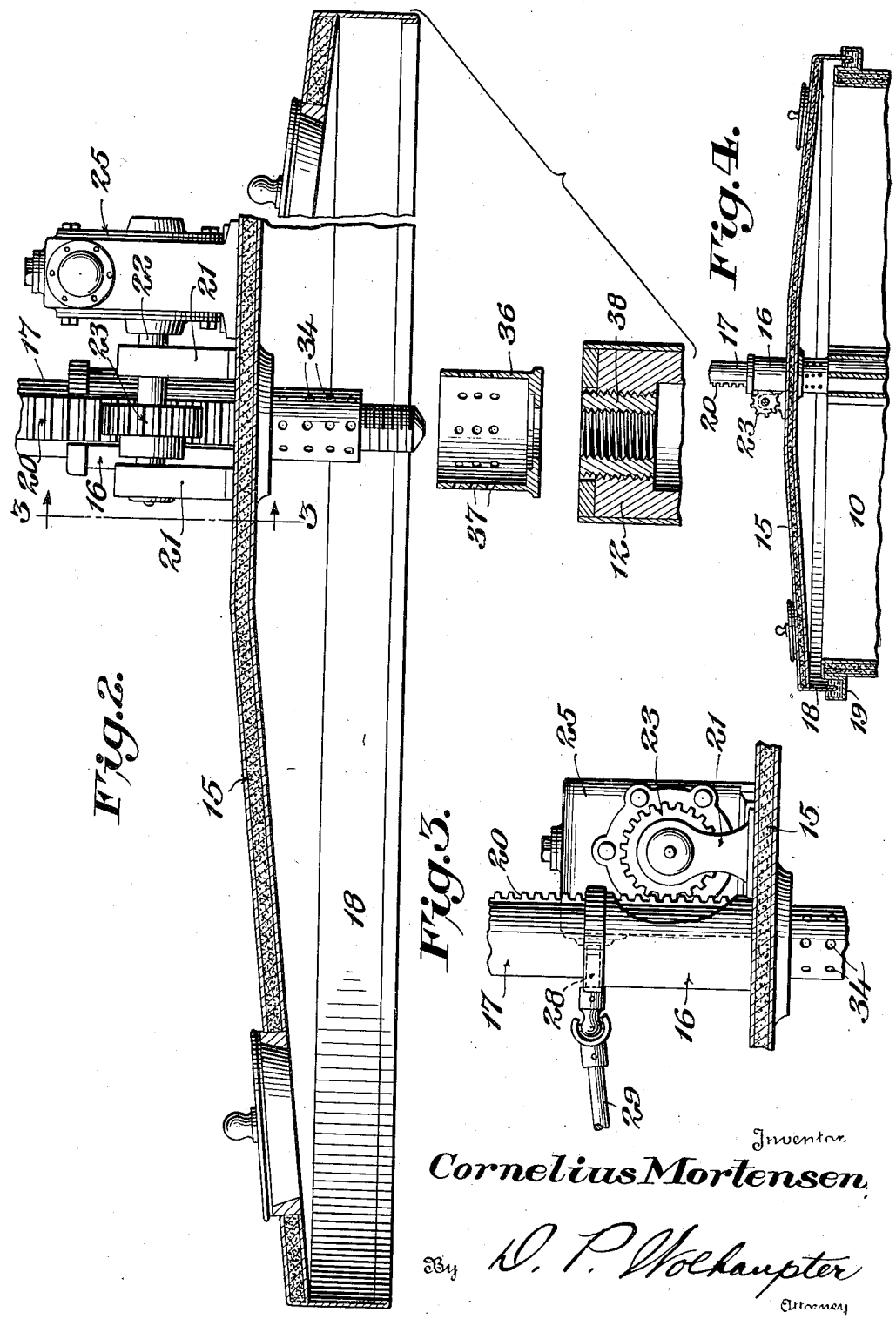

Patented Sept. 13, 1938

2,130,098

UNITED STATES PATENT OFFICE 2,130,098

LIQUID TREATING AND HANDLING APPARATUS

Cornelius Mortensen, Louisville, Ky.

Application March 19, 1937, Serial No. 131,968

9 Claims. (Cl. 137—21)

This invention relates to liquid treating and handling apparatus, and is particularly concerned with improvements in tank covers and operating means therefor; with sealing means between tanks and their covers; with means for the supply of steam or hot air to the cover enclosed space of a tank above the surface of a liquid contained therein to maintain the surface portion of the liquid at a desired temperature; and with means for the drainage of condensate from said space, all capable of use wherever advantageous or desirable, but having special utility when embodied in milk pasteurizing apparatus of the type illustrated, described and claimed in my prior Patent No. 1,749,257, dated March 4, 1930.

One important object of the invention is to provide a strong, rigid, one-piece or unitary cover for a milk holder or other tank, and a simple, easily operated mechanism for raising and lowering said cover, even though the latter may be of considerable size and weight.

Another important object of the invention is to provide an effective liquid seal between the tank and the cover when the latter is lowered or closed, to prevent air exchange between the atmosphere and the cover enclosed space at the top of the tank and to prevent loss of heat from said space.

Another important object of the invention is to provide practical means for the introduction of steam or hot air into the cover enclosed space at the top of the tank above the level of milk as other liquid contained in the tank, so that the surface portion of the milk or other liquid may be maintained at a desired temperature; in the case of milk, at the same temperature, or substantially the same temperature, as the main body of milk.

Another important object of the invention is to provide novel means for the drainage of water of condensation from the cover enclosed space at the top of the tank.

With the foregoing and other objects in view, which will become more fully apparent as the nature of the invention is better understood, the same consists in the novel features of construction, combination and arrangement of parts as will be hereinafter more fully desscribed, illustrated in the accompanying drawings and defined in the appended claims.

In the drawings, wherein like characters of reference denote corresponding parts in the different views:

Figure 2 is a section on the line 2—2 of Figure 1 showing a separated relationship of parts of the apparatus.

Figure 3 is a section on the line 3—3 of Figure 1; and

Figure 4 is a section through the complete cover and the upper portion of the tank of the apparatus.

Figure 1:
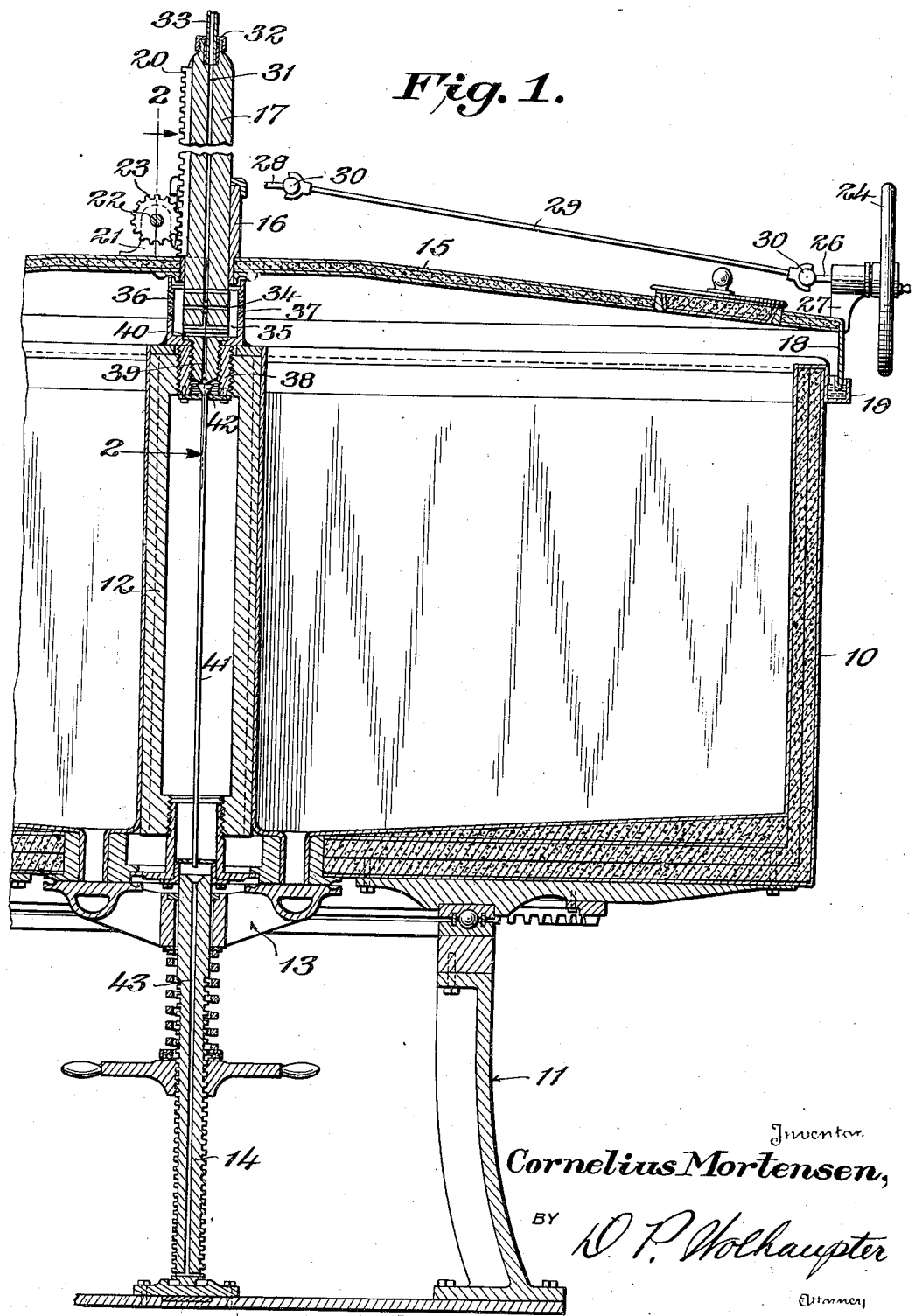
Figure 1 is a central, vertical section through a portion of a milk holder apparatus of the type disclosed in my aforementioned prior patent and embodying the present improvements.

By reference to the drawings it will be noted that the improvements comprising the present invention have been illustrated as embodied in a milk pasteurizing apparatus of the type disclosed in my prior Patent No. 1,749,257. It will be understood, however, that this is merely for convenience and is not to be construed as limiting the range of usefulness of said improvements, as the same may readily and advantageously be embodied in various other types of apparatus. Moreover, since the apparatus herein illustrated is, generally speaking, fully illustrated and described in my aforesaid prior patent, it is not deemed necessary to herein repeat a detailed description of the same. On the contrary, for purposes of the present application it need only be stated that said apparatus comprises a compartmented open-top tank 10 rotatably supported on a base structure 11; that disposed centrally within said tank is a vertical column 12 from which radiate the partitions which divide said tank into separate compartments; that centrally of said tank and below the same is a valve structure, designated generally as 13, by means of which milk is supplied to and delivered from the tank compartments responsive to rotation of the tank, and that supporting a non-rotatable part of said valve structure 13 is a standard 14 which is supported on the base structure 11 and is axially alined with the column 12.

Now, in accordance with one phase of the present invention there is provided for the tank 10 a cover 15 which, as distinguished from the sectional tank cover of my aforesaid prior patent, is advantageously of one-piece or unitary construction and in cross section is of conical or other suitable arched form, whereby it is rendered strong, rigid and form sustaining and thus is adapted to be raised and lowered as a unit even though it may be of considerable size and weight.

Centrally, the cover 15 is suitably provided with a vertically elongated guide sleeve 16 which is rigid with said cover and which is slidably mounted on a vertical standard 17 rigid with and forming an upward extension of the column 12, whereby the cover is guided for straight line raising and lowering movements relative to the tank 10 between open and closed positions relative to the top of said tank.

Marginally, the cover 15 is provided with a downwardly extending flange 18, and at the top of the tank 10 there is suitably provided an open-top trough 19 with which said flange 18 is alined and which is provided to contain water and to receive the free or lower edge portion of said flange 18 when the cover is lowered to its closed position relative to the tank 10, thus to provide a liquid seal to prevent air exchange between the atmosphere and the cover enclosed space at the top of the tank and to prevent loss of heat from said space.

The standard 17 is provided with a rack 20 and the cover 15 has mounted thereon supports 21 in which is journaled a shaft 22 having fixed thereon a pinion 23 which is disposed in mesh with the rack 20. Thus, by rotating the shaft 22 and the pinion 23, the cover may be raised and lowered.

For rotating the shaft 22 there is provided a hand wheel 24 and a connection between said hand wheel and said shaft 22 including a reduced speed gear 25, whereby little effort is required to raise and lower the cover 15 and whereby the latter will remain in any position in which it may be placed. In the present instance the hand wheel 25 is mounted on a shaft 26 which is journaled in a suitable support 27 carried by the cover 15 adjacent to the edge thereof, and the reduced speed gear 25, which may be of any suitable type, is mounted on the cover near the middle thereof and has its driven shaft either comprised by, or connected with, the shaft 22 and its driving shaft 28 connected by a shaft 29 with the hand wheel shaft 26, there being universal joint connections 30 between the shaft 29 and the shafts 26 and 28 because of the angular relationship of said shafts due to the slope of the cover 15.

It is well known that a body of heated milk or other liquid cools most rapidly adjacent to its surface. In the pasteurization of milk according to the method of holding the milk for a period of approximately thirty minutes at a temperature of between 142° F. and 145° F., it is very desirable that all portions of the milk be maintained at an even temperature. Therefore, according to another phase of the present invention provision is made for supplying steam or hot air to the cover enclosed space at the top of the tank 10, above the surface of milk contained in said tank, to maintain the surface portion of the milk at the same temperature, or approximately the same temperature, as its main body portion. A duct 31 is formed longitudinally through the standard 17 from the top thereof to a point adjacent to the top of the column 12 and at its top the said standard 17 is provided with any suitable means 32 for the connection thereto of a pipe or hose 33 for the supply of steam or hot air to said duct 31. Near the lower end of the standard 17, or, in other words, in that portion thereof which is disposed below the cover 15 when the latter is in its lowermost or closed position, said standard is provided with a plurality of steam or air outlet ducts 34 leading from the duct 31 through the side of the standard into a chamber 35 formed by a sleeve-like member 36 which is disposed in surrounding, spaced relationship to said standard and which itself is provided with a number of small apertures 37, preferably upwardly sloping, for discharge of steam from said chamber 35 into the cover enclosed space at the top of the tank 10 above the surface of milk contained in said tank.

The sleeve-like member 36 may comprise part of the column 12 or part of the standard 17 or it may be mounted either on the column 12 or on the cover 15. Similarly, the standard 17 may comprise an integral extension of the column 12, or it may be separate from said column and may be mounted thereon in any suitable manner. Preferably, however, the standard 17 is separate from the column 12 and has a screw threaded bottom connection therewith, either directly, or, as shown, through the instrumentality of a bushing 38. Preferably, too, the sleeve-like member 36 is separate from the column 12, the standard 17 and the cover 15 and is in the form of a cup having a bottom provided with an opening through which the threaded lower end of the standard 17 extends, and having its bottom engaged by a shoulder on the standard 17. Thus, it is held properly assembled with the column 12 and the standard 17 when the latter is operatively mounted in said column, and is readily separable from said column and standard for cleaning or other purposes when the standard is unscrewed from the column. As shown, the height of the member 36 is such that when the cover 15 is in its lowermost or closed position, said member cooperates at its top with the cover 15 to close the top of the chamber 35.

Because of the member 36, steam or air is distributed uniformly to the cover enclosed space at the top of the tank 10, and, should any considerable amount of moisture be contained in the steam or air, said member serves to intercept most of such moisture and to prevent it from entering said cover enclosed space.

Since the member 36 serves as a moisture intercepter, it is necessary to provide for drainage of moisture from the chamber 35. Accordingly, the lower portion of the standard 17 is provided with a longitudinally extending duct 39 which opens through the bottom of said standard and is in communication with the bottom of the chamber 35 through one or more additional ducts 40 formed laterally through said standard 17. Thus, any moisture which may be trapped in the chamber 35 drains therefrom through the ducts 40 and 39.

For carrying off moisture draining through the duct 39 there is suitably mounted within the column 12 a small tube 41 which, at its upper end, is provided with a funnel-like formation 42 underlying the duct 39 and, at its lower end, is disposed in discharging relationship to a duct 43 formed through the standard 14.

The member 36 may not serve to intercept all moisture contained in steam or air supplied to the cover enclosed space at the top of the tank 10 and there may occur a collection of moisture on the underside of the cover 15 due to condensation. In that event, due to the downwardly and outwardly sloping form of the cover, such moisture will flow toward the edge of the cover and finally will gravitate into the trough 19. The milk or other liquid contained in the tank 10 thus is maintained free of any moisture which may be carried into the cover inclosed space at the top of the tank with the steam or air which is utilized to maintain the surface portion of the milk or other liquid at the desired temperature.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:—

1. In apparatus of the character described, a tank, a cover therefor, a fixed standard on which said cover is centrally slidably mounted for raising and lowering movements between opened and closed positions, a rack on said standard, a support on the cover, a shaft journaled in said support, a pinion on said shaft in mesh with said rack, and a hand wheel on the cover at the edge thereof and operatively connected to said shaft for effecting its rotation to raise and lower the cover.

2. In apparatus of the character described, a tank, a cover therefor, a standard extending through the cover and by which the cover is guided for sliding movements between raised and lowered positions, said standard having ducts for supply of a heating fluid to the cover enclosed space at the top of the tank, a sleeve-like member surrounding said standard in spaced relationship thereto and providing a chamber into which the heating fluid is delivered prior to its delivery into said cover enclosed space, said member having openings for flow of the heating fluid from said chamber to said space, and means for the drainage of moisture from said chamber.

3. In apparatus of the character described, a tank, a cover therefor, a valve mechanism at the bottom of the tank for supply and delivery of liquid to and from the tank, a standard supporting part of said valve mechanism, a standard on which the cover is slidably mounted for raising and lowering movements between open and closed positions, means for the supply of a heating fluid through said second mentioned standard to the cover enclosed space at the top of the tank, moisture collecting means within the cover enclosed space at the top of the tank, and means for the drainage of moisture from said moisture collecting means through said first mentioned standard.

4. In apparatus of the character described, a tank, a central column therein, a standard rising from said column, a tank cover mounted on said standard for sliding movements between raised and lowered opened and closed positions, a sleeve surrounding the lower portion of said standard and cooperating with the cover when the latter is lowered to provide a chamber around said standard and means for the supply of a heating fluid through said standard to said chamber, said sleeve having apertures for uniform distribution of the heating fluid into the cover enclosed space at the top of the tank.

5. In apparatus of the character described, a tank, a central column therein, a standard having a screw threaded connection at its bottom with said column and rising from said column, a tank cover mounted on said standard for sliding movements between raised and lowered opened and closed positions, a cup-like member clamped at its bottom between said standard and said column and disposed in surrounding spaced relationship to said standard, said member being of a height such that it is closed at its top by the cover when the latter is lowered, the standard having ducts for the supply of a heating fluid to the interior of said member, said member being apertured for uniform distribution of the heating fluid to the cover enclosed space at the top of the tank, and means for the drainage of moisture from said member.

6. In apparatus of the character described, a tank, a cover therefor, spaced inner and outer walls providing an annular chamber within the cover enclosed space at the top of said tank, means for the supply of steam to said chamber through the inner wall thereof, the outer wall of said chamber having openings for the distributed outlet of steam from said chamber to said cover enclosed space, and means for the drainage of condensate from said chamber through the inner wall thereof.

7. In a pasteurizing apparatus, a tank, a cover therefor, a fixed standard on which said cover is slidably mounted and guided for raising and lowering movements between open and closed positions, a manually operated pinion carried by said cover and a rack on said standard for engaging with the pinion to raise and lower said cover.

8. In a pasteurizing apparatus, a tank, a marginal gutter at the upper edge of the tank, a cover for the tank including a downwardly directed outer edge portion disposed in said gutter when the cover is closed, a standard on which said cover is mounted for sliding movement between raised and lowered, opened and closed positions relative to said tank, rack and gear means respectively carried by the standard and the cover for operating said cover, and means for supplying steam through said standard to the cover enclosed space at the top of the tank.

9. In a pasteurizing apparatus, a tank, a cover therefor, means providing a steam distributing chamber within the cover enclosed space at the top of said tank, said means including a steam supplying head having radial ports communicating with a central steam supply passage, an annular foraminous member surrounding said head to distribute steam from said chamber to said cover enclosed space, and means for draining condensate from between said head and foraminous member.

CORNELIUS MORTENSEN.